US006985167B2

(12) United States Patent
Lien

(10) Patent No.: US 6,985,167 B2
(45) Date of Patent: Jan. 10, 2006

(54) CARD CLEANER ROLLER ASSEMBLY

(75) Inventor: Brent D. Lien, Minneapolis, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 309 days.

(21) Appl. No.: 10/372,071

(22) Filed: Feb. 21, 2003

(65) Prior Publication Data

US 2003/0164982 A1 Sep. 4, 2003

Related U.S. Application Data

(60) Provisional application No. 60/361,210, filed on Mar. 1, 2002.

(51) Int. Cl.
 *B41J 29/17* (2006.01)
(52) U.S. Cl. ...................................... 347/218
(58) Field of Classification Search ................ 347/171, 347/218; 400/701, 120.01; 101/425
See application file for complete search history.

(56) References Cited

U.S. PATENT DOCUMENTS

| | | | |
|---|---|---|---|
| 3,446,415 A | 5/1969 | Bromley ....................... 229/30 |
| 3,598,396 A | 8/1971 | Andrews et al. ................ 271/9 |
| 3,755,653 A | 8/1973 | Venker ..................... 235/61.11 |
| 3,761,079 A | 9/1973 | Azure, Jr. ..................... 271/41 |
| 3,887,106 A | 6/1975 | Charlson et al. ............. 221/197 |
| 3,889,472 A | 6/1975 | Guillaud ....................... 60/698 |
| 3,960,072 A | 6/1976 | Ahlgren et al. ............... 101/35 |
| 4,015,839 A | 4/1977 | McKee ......................... 271/37 |
| 4,017,068 A | 4/1977 | McKee ........................ 271/275 |
| 4,021,032 A | 5/1977 | Gross et al. ................. 271/166 |
| 4,031,518 A | 6/1977 | Holloran et al. .......... 340/172.5 |
| 4,068,028 A | 1/1978 | Samonides ................... 428/40 |
| 4,102,267 A | 7/1978 | Ritzerfeld ................ 101/132.5 |
| 4,146,900 A | 3/1979 | Arnold ......................... 346/75 |
| 4,161,312 A | 7/1979 | Eckhardt et al. ................ 271/3 |
| 4,393,386 A | 7/1983 | Di Giulio ..................... 346/75 |
| 4,534,313 A | 8/1985 | Louvel ........................ 118/696 |
| 4,604,631 A | 8/1986 | Jinnai et al. ................. 346/1.1 |
| 4,680,596 A | 7/1987 | Logan ......................... 346/140 |
| 4,685,702 A | 8/1987 | Kazuharu .................... 283/81 |

(Continued)

FOREIGN PATENT DOCUMENTS

DE   25 35 699 A1   3/1977

(Continued)

OTHER PUBLICATIONS

Office Communication for U.S. Appl. No. 10/126,441, filed Apr. 19, 2002, date of mailing: Sep. 15, 2004.

(Continued)

*Primary Examiner*—Huan Tran
(74) *Attorney, Agent, or Firm*—Westman, Champlin & Kelly

(57) ABSTRACT

A card cleaner roller assembly for use in an identification card printer includes first and second cleaner pinch rollers, first and second tape rollers, first and second brackets, and a biasing mechanism. The first and second cleaner controllers are adapted to receive a transported card therebetween. The first and second tape rollers support a cleaning tape loop that is sandwiched between the second cleaner roller and the first tape roller. The cleaning tape loop includes a debris-collecting exterior surface that engages the second cleaner roller. The first bracket supports the first and second cleaner rollers and the first tape roller. The second bracket supports the second tape roller. The first and second brackets are assembled in sliding arrangement with each other and include a roller release position and an operating position. The biasing mechanism is configured to bias the first and second brackets in the operating position.

11 Claims, 4 Drawing Sheets

U.S. PATENT DOCUMENTS

| | | | |
|---|---|---|---|
| 4,686,540 A | 8/1987 | Leslie et al. | 346/33 |
| 4,716,346 A | 12/1987 | Matsuo | 318/38 |
| 4,734,868 A | 3/1988 | DeLacy | 364/519 |
| 4,750,743 A | 6/1988 | Nicoletti | 273/148 |
| 4,781,985 A | 11/1988 | Desjarlais | 428/421 |
| 4,782,363 A | 11/1988 | Britt et al. | 355/14 |
| 4,797,018 A | 1/1989 | Hofmann et al. | 400/208 |
| 4,845,490 A | 7/1989 | Ward et al. | 340/825.31 |
| 4,961,088 A | 10/1990 | Gilliland et al. | 355/206 |
| 5,018,614 A | 5/1991 | Ruckert | 194/236 |
| 5,019,839 A | 5/1991 | Watanabe et al. | 346/134 |
| 5,077,467 A | 12/1991 | Barron, Jr. et al. | 250/221 |
| 5,111,239 A | 5/1992 | Kamimura et al. | 355/45 |
| 5,138,344 A | 8/1992 | Ujita | 400/175 |
| 5,149,211 A | 9/1992 | Pettigrew | 400/88 |
| 5,184,181 A | 2/1993 | Kurando et al. | 355/260 |
| 5,239,926 A | 8/1993 | Nubson et al. | 101/487 |
| 5,266,968 A | 11/1993 | Stephenson | 400/208 |
| 5,267,800 A | 12/1993 | Petterutl et al. | 400/88 |
| 5,277,501 A | 1/1994 | Tanaka et al. | 400/120 |
| 5,318,370 A | 6/1994 | Nehowig | 400/207 |
| 5,327,201 A | 7/1994 | Coleman et al. | 355/278 |
| 5,368,677 A | 11/1994 | Ueda et al. | 156/362 |
| 5,455,617 A | 10/1995 | Stephenson et al. | 400/207 |
| 5,466,319 A | 11/1995 | Zager et al. | 156/220 |
| 5,502,464 A | 3/1996 | Takahashi et al. | 346/23 |
| 5,516,218 A | 5/1996 | Amano et al. | 400/535 |
| 5,530,468 A | 6/1996 | Yoshimi et al. | 347/262 |
| 5,630,581 A | 5/1997 | Rodesch | 271/23 |
| 5,642,877 A | 7/1997 | Green | 271/35 |
| 5,646,388 A | 7/1997 | D'Entremont et al. | 235/380 |
| 5,695,589 A | 12/1997 | German et al. | 156/250 |
| 5,703,347 A | 12/1997 | Reddersen et al. | 235/472 |
| 5,707,162 A | 1/1998 | Kasal et al. | 400/692 |
| 5,709,484 A | 1/1998 | Dorner | 400/188 |
| 5,755,519 A | 5/1998 | Klinefelter | 400/249 |
| 5,772,199 A | 6/1998 | Green | 271/10.06 |
| 5,820,281 A | 10/1998 | Hill et al. | 400/621 |
| 5,837,991 A | 11/1998 | LaManna et al. | 235/475 |
| 5,882,127 A | 3/1999 | Amano | 400/521 |
| 5,936,008 A | 8/1999 | Jones et al. | 523/161 |
| 5,941,414 A | 8/1999 | Kasper | 221/210 |
| 5,978,621 A | 11/1999 | Glemser et al. | 399/90 |
| 5,980,011 A | 11/1999 | Cummins et al. | 347/4 |
| 5,995,774 A | 11/1999 | Applegate et al. | 399/27 |
| 6,011,741 A | 1/2000 | Wallace et al. | 365/221 |
| 6,037,879 A | 3/2000 | Tuttle | 340/825.54 |
| 6,039,430 A | 3/2000 | Helterline et al. | 347/19 |
| 6,071,024 A | 6/2000 | Chi-Ming et al. | 347/177 |
| 6,072,402 A | 6/2000 | Kniffin et al. | 340/825 |
| 6,076,913 A | 6/2000 | Garcia et al. | 347/19 |
| 6,099,101 A | 8/2000 | Maurelli et al. | 347/7 |
| 6,099,178 A | 8/2000 | Spurr et al. | 400/207 |
| 6,113,208 A | 9/2000 | Benjamin et al. | 347/7 |
| 6,163,658 A | 12/2000 | Suzuki | 399/12 |
| 6,179,401 B1 | 1/2001 | Stephens, Jr. et al. | 347/19 |
| 6,213,392 B1 | 4/2001 | Zuppicich | 235/380 |
| 6,252,791 B1 | 6/2001 | Wallace et al. | 365/221 |
| 6,253,329 B1 | 6/2001 | Kang | 713/300 |
| 6,263,170 B1 | 7/2001 | Bortnem | 399/13 |
| 6,264,296 B1 | 7/2001 | Klinefelter et al. | 347/4 |
| 6,264,301 B1 | 7/2001 | Helterline et al. | 347/19 |
| 6,267,463 B1 | 7/2001 | Paulsen | 347/19 |
| 6,271,928 B1 | 8/2001 | Bullock et al. | 358/1.16 |
| 6,302,527 B1 | 10/2001 | Walker | 347/50 |
| 6,305,795 B2 | 10/2001 | Childers et al. | 347/86 |
| 6,312,083 B1 | 11/2001 | Moore | 347/19 |
| 6,312,106 B1 | 11/2001 | Walker | 347/50 |
| 6,325,495 B1 | 12/2001 | Foth | 347/84 |
| 6,341,839 B1 | 1/2002 | Burikov et al. | 347/37 |
| 6,371,586 B1 | 4/2002 | Saruta | 347/7 |
| 6,405,055 B1 | 6/2002 | Silverbrook et al. | 455/556 |
| 6,464,317 B2 | 10/2002 | Miyazawa | 347/14 |
| 6,554,512 B2 | 4/2003 | Heno et al. | 400/625 |
| 6,582,141 B2 * | 6/2003 | Meier et al. | 400/701 |
| 6,647,871 B2 | 11/2003 | Morand | 101/33 |
| 6,663,100 B2 | 12/2003 | Crowley | 271/165 |
| 6,694,884 B2 | 2/2004 | Klinefelter et al. | 101/484 |
| 6,702,282 B2 | 3/2004 | Pribula et al. | 271/272 |
| 6,758,616 B2 | 7/2004 | Pribula et al. | 400/624 |
| 6,832,866 B2 | 12/2004 | Klinefelter et al. | 400/668 |
| 2002/0180993 A1 | 12/2002 | Klinefelter et al. | 358/1.1 |
| 2003/0152409 A1 | 8/2003 | Pribula et al. | 400/718 |
| 2003/0197770 A1 | 10/2003 | Klinefelter et al. | 347/104 |
| 2003/0216826 A1 | 11/2003 | Klinefelter et al. | 700/95 |

FOREIGN PATENT DOCUMENTS

| | | |
|---|---|---|
| EP | 0 562 979 | 9/1993 |
| EP | 0 887 197 | 12/1998 |
| EP | 0 979 736 | 2/2000 |
| GB | 2 120 821 A | 12/1983 |
| JP | 411105359 A | 4/1999 |
| JP | 11 265463 | 9/1999 |
| WO | WO 95/09084 | 4/1995 |
| WO | WO 98/52762 | 11/1998 |
| WO | WO 99/04368 | 1/1999 |
| WO | WO 99/21713 | 5/1999 |
| WO | 99/49379 | 9/1999 |

OTHER PUBLICATIONS

"Standard Read/Write Identification IC", by TEMIC Semiconductor GmbH, Heilbronn, Germany, (Apr. 1999).

"Introducing the New SmartGuard™ and SmartShield™ Advanced Security Options", pamphlet by Fargo Electronics, Inc., Eden Prairie, Minnesota (1998).

"RFID Tagging IC is First to Accept Input from Sensors", by Microchip Technology Inc., undated.

Two page web site advertisement from SEIKO Precision, entitled "The lastest design for your CD-R", re: CD Printer 2000.

Two page web site advertisement from SEIKO Precision, entitled "CD Printer 2000".

Two page web site advertisement from SEIKO Precision, entitled "CD Printer 4000".

Partial International Search for International Application No. PCT/US 01/17146, filed May 25, 2001 (with Invitation to Pay Fees).

International Search Report for International Application No. PCT/US 00/01697, filing date Jan. 21, 2000, dated Oct. 18, 2000.

Streamfeeder—ST 1250 Universal Friction Feeder; last modified Feb. 27, 2000; 1 page with heading of "Streamfeeder—Product Index"; and 3 pages with heading of "Streamfeeder—ST 1250 Universal Friction Feeder".

* cited by examiner

CARD CLEANER ROLLER ASSEMBLY

CROSS-REFERENCE TO RELATED APPLICATION

This application claims priority from U.S. Provisional Application No. 60/361,210 filed on Mar. 1, 2002 for inventor Brent D. Lien and entitled CARD CLEANER ROLLER ASSEMBLY.

FIELD OF THE INVENTION

The present invention generally relates to identification card printers and, more particularly, to a card cleaner roller assembly for use in an identification card printer.

BACKGROUND

Identification card printers along with the aid of a computer are typically used to form identification cards by printing an image on a print receptive surface of a card substrate. The image generally includes a photograph and other information relating to the card holder, such as the card holder's name, employee number, and other information. Such identification cards are used for many purposes, such as driver's licenses, identification badges, etc.

The image that is to be printed on the surface of the card by the identification card printer is generally formed by combining textual and graphical portions received from host applications running on the computer or from other input devices such as keyboards, scanners, and digital cameras. Data relating to the formatted image is then provided to the identification card printer in the form of a print job. The identification card printer processes the print job by printing the image onto the print receptive surface of the card substrate.

Identification card printers generally employ a card holder containing a stack of the card substrates, a card transport mechanism, and a print mechanism. The card transport mechanism is generally configured to transport cards from the card holder to the print mechanism for printing. Thermal-based identification card printers employ a print mechanism having a thermal print ribbon having primary color dye panels and a thermal printhead. The thermal printhead heats the ribbon and causes dye on the color panels to be released and sublimate into the print receptive surface of the card substrate. Alternatively, the identification card printer can employ an ink jet printhead having a supply of ink.

Identification card printer designers are continuously striving to improve the quality of the image that is printed on the card substrate. The print quality is determined, in part, by the quality of the print mechanism and the print receptive surface of the card substrate. Additionally, the print of an image is limited to the cleanliness of the print receptive surface of the card substrate. Thus, the more the print receptive surface is contaminated by dust and debris, the lower the quality of the image that can be printed thereon.

Such contaminants can infiltrate identification card printers in many different ways. Dust can enter the identification card printer through vents and be circulated through the printer by cooling fans. Such contaminants can be attracted to the surfaces of the card substrates due to static charge. This is particularly problematic when, for example, the card holder of the identification card printer is not configured to fully enclose the stack of cards, but includes an opening to allow for easy loading and unloading of the cards. However, even when the card holder fully encloses the cards, there may be no guarantee that the cards enclosed therein are contaminate free. Jostling of the cards during transport could generate undesirable contaminants. Additionally, once the cards are ejected from the enclosed card holder, contaminants circulating through the identification card printer can be attracted to the print receptive surface of the card.

SUMMARY

The present invention is directed to a card cleaner roller assembly for use in an identification card printer that is configured to remove contaminants from print receptive surfaces of card substrates to improve the quality of the images that are printed thereon. The card cleaner roller assembly generally includes first and second cleaner pinch rollers, first and second tape rollers, first and second brackets, and a biasing mechanism. The first and second cleaner pinch rollers are adapted to receive a transported card therebetween. The first and second tape rollers support a cleaning tape loop that is sandwiched between the second cleaner roller and the first tape roller. The cleaning tape loop includes a debris-collecting exterior surface that engages the second cleaner roller. The first bracket supports the first and second cleaner rollers and the first tape roller. The second bracket supports the second tape roller. The first and second brackets are assembled in sliding arrangement with each other and include a roller release position in which at least one of the first and second cleaner pinch rollers or the first tape roller is removable, and an operating position in which the first and second cleaner pinch rollers are set to clean a transported card. The biasing mechanism is configured to bias the first and second brackets in the operating position.

Other features and benefits that characterize embodiments of the present invention will be apparent upon reading the following detailed description and review of the associated drawings.

DETAILED DESCRIPTION

Figure 1:
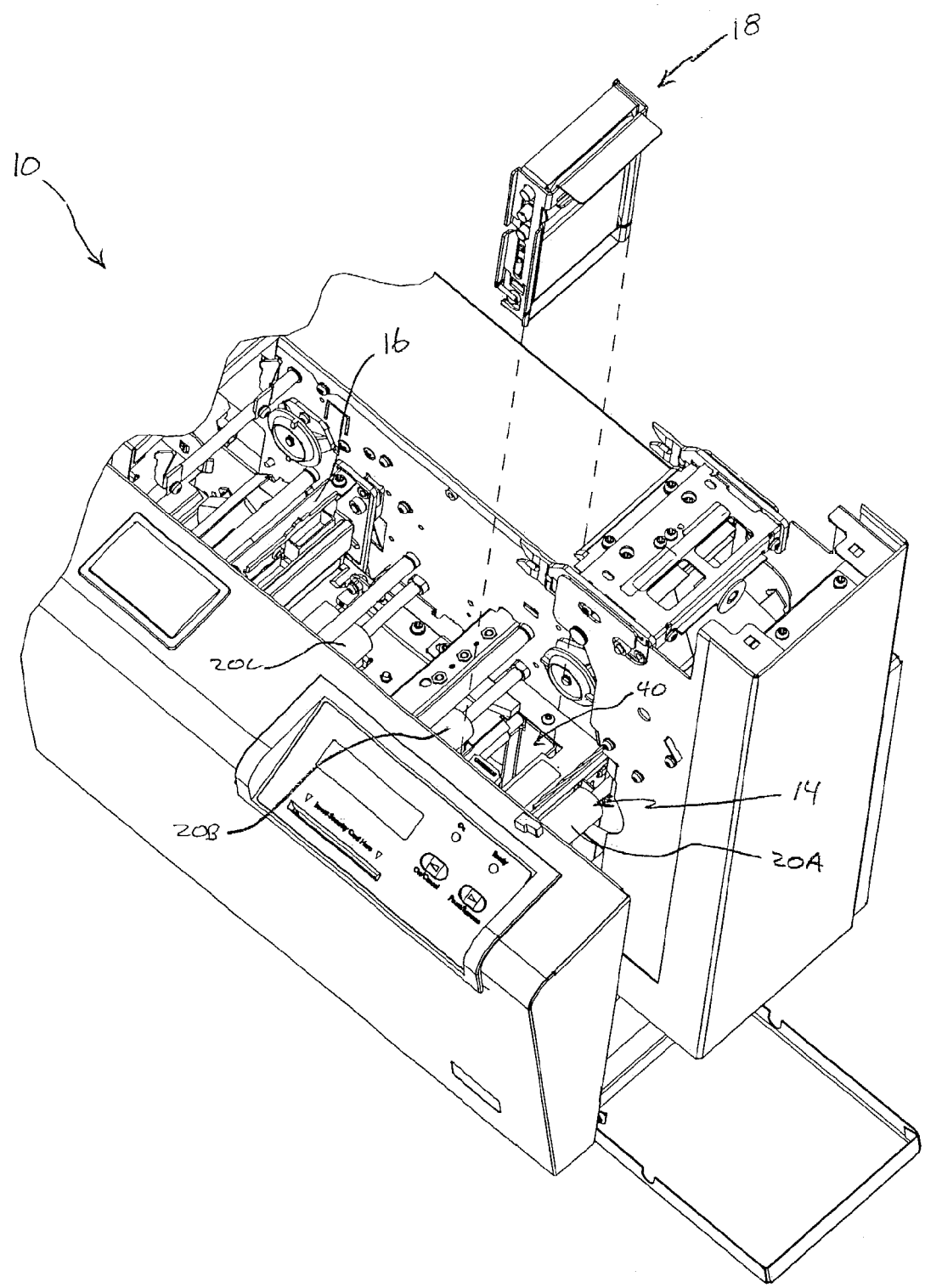
FIG. 1 is a partial perspective view of an identification card printer that includes a card cleaner roller assembly of the present invention.
Figure 2:
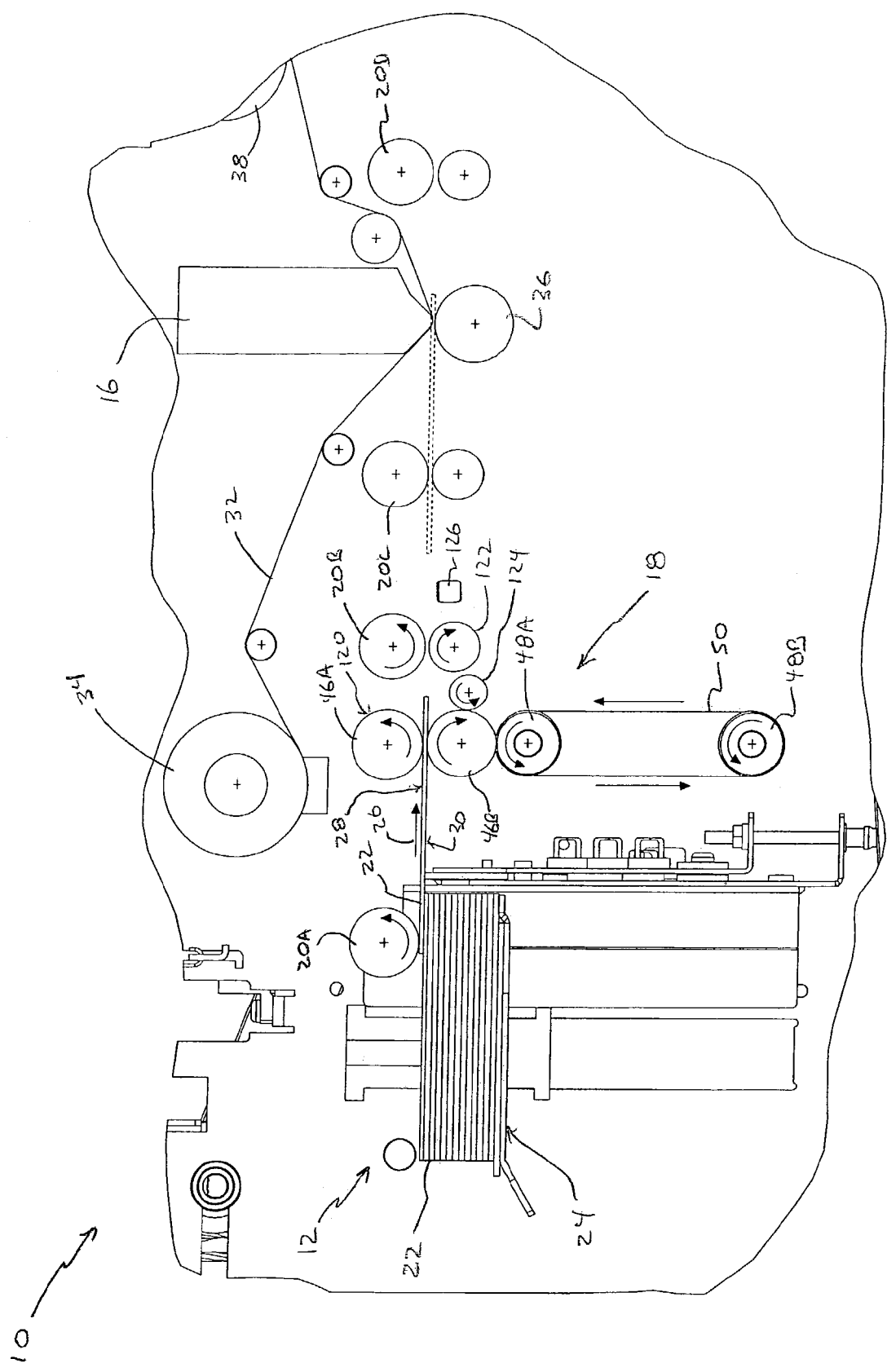
FIG. 2 is a simplified partial side view of an identification card printer including a card cleaner roller assembly in accordance with the present invention.

FIGS. 1 and 2 respectively show partial perspective and side views of an identification card printer 10 in accordance with an embodiment of the invention. Identification card printer 10 generally includes a card supply 12, a card transport mechanism 14 and a printhead 16. Additionally, identification card printer 10 includes a card cleaner roller assembly (hereinafter "card cleaner") 18 that is configured to clean print receptive surfaces of the cards as they are transported by card transport mechanism 14. Identification card printer 10 can also include a magnetic stripe, an encoder, a card flipper, a laminator, and other identification card processing devices.

The card transport mechanism 14 can include various card feed rollers, generally designated as 20, including card feed rollers 20A, 20B, 20C and 20D, for example. The card feed rollers 20 of the transport mechanism 14 are adapted to transport individual cards 22 from card supply 12 along a print path through printer 10.

Card supply 12 can include a card hopper or card cartridge in which the stack of cards 22 are contained. In accordance with the depicted embodiment, card supply 12 includes a plate card stacker 24 that moves upward to thereby cause a top card 22 to engage card feed roller 20A, and cause the top card 22 to be fed forward along the print path, as indicated by arrow 26 and through card cleaner 18, which cleans upper and lower print receptive surfaces 28 and 30 of the card 22. Card 22 then travels further along the print path by card feed rollers 20B and 20C of the transport mechanism 14 to printhead 16.

Printhead 16 is depicted as a thermal printhead that deposits print material on upper print surface 28 of card 22 by heating a thermal print ribbon 32 that is fed from a supply roll 34 between printhead 16 and a print roller 36. The thermal print ribbon 32 is then received by a take-up roll 38. Printhead 16 could also be an inkjet printhead or other suitable print mechanism.

Card cleaner 18 is preferably configured to be easily removed and inserted into identification card printer 10 as indicated by the dashed lines in FIG. 1. A suitably sized slot 40 is configured to receive card cleaner 18 and support card cleaner 18 such that it is aligned to receive cards 22 transported by transport mechanism 14 along the print path.

Figure 3:
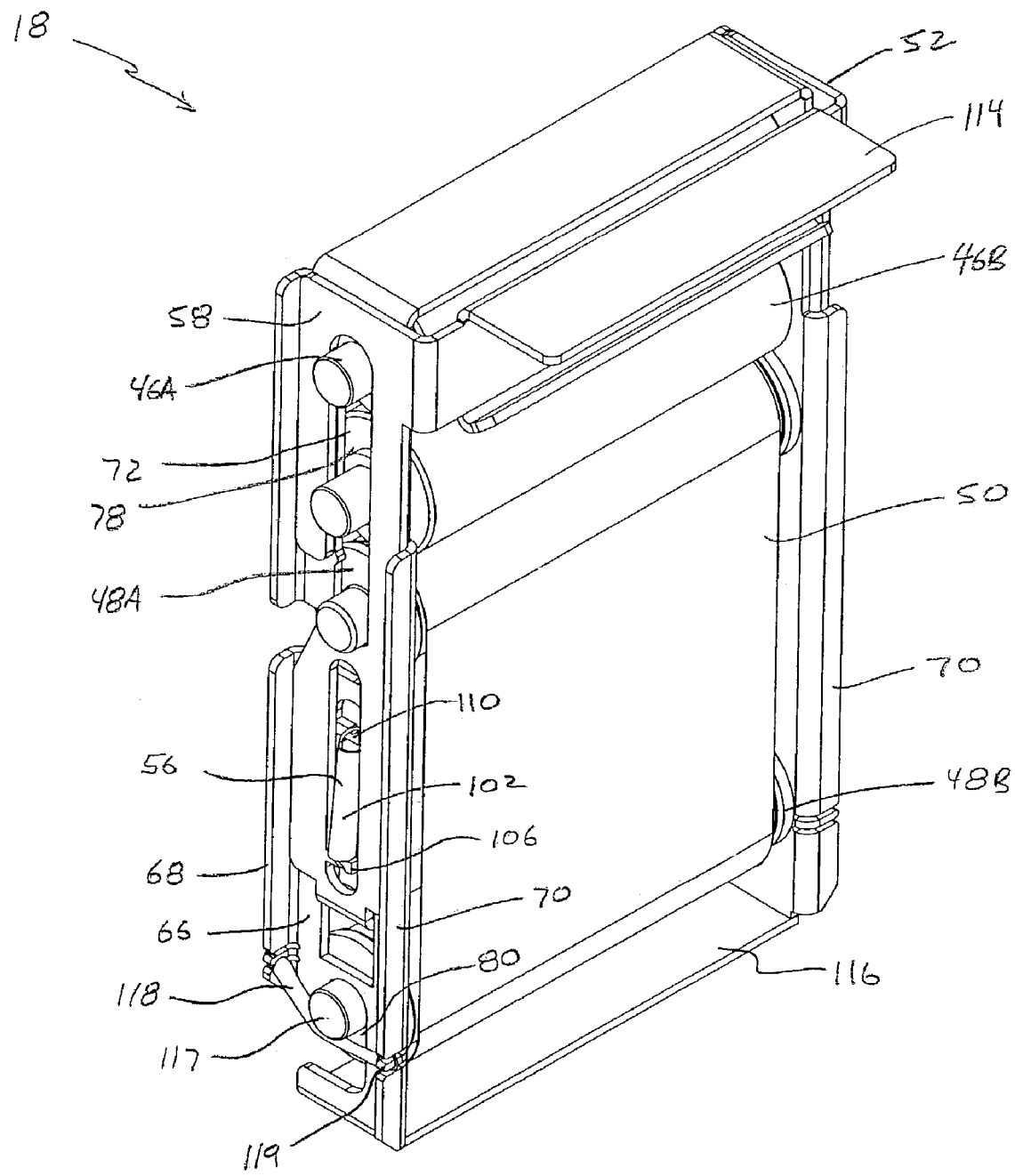
FIG. 3 is a perspective view of a card cleaner roller assembly in accordance with embodiments of the invention.
Figure 4:
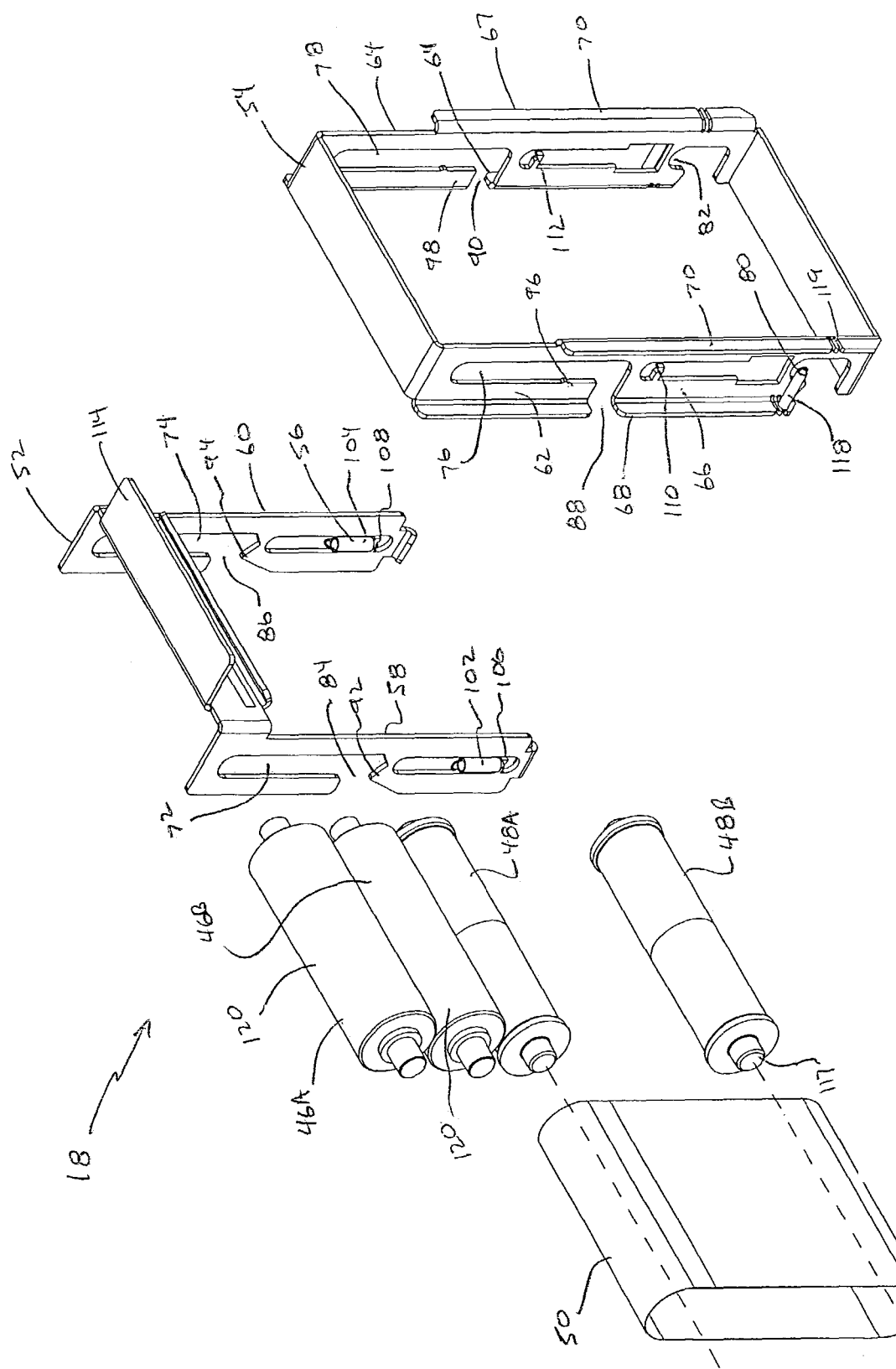
FIG. 4 is an exploded perspective view of a card cleaner roller assembly in accordance with embodiments of the invention.

FIGS. 3 and 4 are assembled and exploded perspective views of card cleaner 18 in accordance with embodiments of the invention. Card cleaner 18 generally includes first and second cleaner pinch rollers 46A and 46B, first and second tape rollers 48A and 48B, a cleaning tape loop 50, first and second brackets 52 and 54, and a biasing mechanism 56. The first and second cleaner rollers 46A and 46B are adapted to receive a transported card 22 therebetween that has been fed along the print path by feed roller 20A. The first and second tape rollers 48A and 48B support the cleaning tape loop 50, which is sandwiched between the second cleaner roller 46B and the first tape roller 48A.

First bracket 52 includes first and second side walls 58 and 60 which slideably engage corresponding side walls 62 and 64 of second bracket 54. Side walls 58 and 60 of first bracket 52 are maintained within channels 66 and 67 formed by front flanges 68 and rear flanges 70 of side walls 62 and 64 of second bracket 54.

First and second cleaner rollers 46A and 46B and first tape roller 48A are supported within channels 72 and 74 of first bracket 52 and channels 76 and 78 of second bracket 54. Second cleaner roller 48B is supported in notches 80 and 82 of side walls 62 and 64, respectively. Tape loop 50 is wound around first and second tape rollers 48A and 48B and is sandwiched between second cleaner roller 46B and first tape roller 48A, as shown in FIGS. 2 and 3.

The slidable arrangement between first and second brackets 52 and 54 allow card cleaner 18 to move between a "release position," in which the card cleaner 18 can be disassembled and tape loop 50 can be replaced, and an "operating position," in which card cleaner 18 is positioned in when inserted in printer 10. In the release position, openings 84 and 86 to channels 72 and 74 of first bracket 52 respectively align with openings 88 and 90 of second bracket 54. Thus, the release position allows for the removal or insertion of first tape roller 48A and first and second cleaner rollers 46A and 46B. In the operating position, openings 84 and 86 of first bracket 52 and openings 88 and 90 of second bracket 54 are misaligned thereby securing first and second cleaner rollers 46A and 46B and first tape roller 48A within the channels 72, 74, 76 and 78 of first and second brackets 52 and 54, as shown in FIG. 3. More particularly, first bracket 52 is moved upward relative to second bracket 54 such that tabs 92 and 94 close opening 88 and 90 of second bracket 54. Additionally, side wall members 96 and 98 of second bracket 54 close openings 84 and 86 of first bracket 52.

The biasing mechanism 56 is adapted to bias card cleaner 18 in the operating position. In accordance with one embodiment, biasing mechanism 56 includes springs 102 and 104. One end of springs 102 and 104 is attached to first bracket 52 at extensions 106 and 108 and the other end of springs 102 and 104 is attached to second bracket 54 at extensions 110 and 112. Card cleaner 18 can be moved to the release position by compressing card cleaner 18 between tab 114 and base member 116. This causes side walls 58 and 60 of first bracket 52 to slide within channels 66 and 67 of second bracket 54 toward the release position. During this change from the operating position to the release position, springs 102 and 104 of biasing mechanism 56 stretch and generate a force that counteracts the compression of card cleaner 18. When the compression of card cleaner 18 is removed, springs 102 and 104 of biasing mechanism 56 force the relative positions of the first and second brackets 52 and 54 back to the operating position. Those skilled in the art understand that biasing mechanism 56 can take on many different forms while providing the desired function of maintaining card cleaner 18 in the operating position when in use.

Second tape roller 48B is anchored within notches 80 and 82 using any appropriate means. In accordance with one embodiment, each axle end 117 of the second tape roller 48B is secured within the corresponding notch 80 or 82 using a spring 118 which wraps around the axle end 117 and attaches to second bracket 54 at a hook 119, as shown in FIG. 3.

Tape loop 50 can be changed periodically by removing card cleaner 18 from printer 10 and compressing the first and second brackets 52 and 54 together into the release position as discussed above. When in the release position, openings 84 and 86 of first bracket 52 align with openings 88 and 90 of second bracket 54 to thereby allow for the removal of first tape roller 48A as well as cleaner rollers 46A and 46B. Second tape roller 48B can also be removed from second bracket 54, which then allows tape loop 50 to be replaced.

A new tape loop 50 can then be inserted by generally reversing the above procedure.

In operation, a card 22 being fed along the print path by feed roller 20B is fed between cleaner pinch rollers 46A and 46B, as shown in the simplified side view of FIG. 2. Cleaner rollers 46A and 46B have an exterior surface 120 formed of a contaminant-collecting material to which dust and other particles on print surfaces 28 and 30 of the card 22 adhere. In accordance with one embodiment of the invention, the contaminant-collecting material has a high coefficient of friction and is formed of an elastomer material having a silicone coating. As card 22 is sent between cleaner rollers 46A and 46B by feed roller 20A, they rotate, which in turn causes tape spool 50 and first and second tape rollers 48A and 48B to rotate, as indicated by the corresponding arrows. Over time, debris from the first cleaner roller 46A transfers to the second cleaner roller 46B, which in turn is cleaned by the tape loop 50. Tape loop 50 includes a tacky exterior surface that removes particles that have adhered to the exterior surface 120 of second cleaner roller 46B.

Once the front of the card 22 is sent through card cleaner 18, it is fed between feed roller 20B and idler roller 122, which continue to drive card 22 along the print path. It is possible that card 22 can become jammed in card cleaner 18 prior to receipt of the card 22 by card feed roller 20B of the transport mechanism 14. In accordance with one embodiment of the invention, this problem is solved by driving the cleaner rollers of card cleaner 18. In the example shown, a cleaner roller driver 124 is provided, which engages the exterior surface of second cleaner roller 46B when card cleaner 18 is inserted in printer 10. Cleaner roller driver 124 is driven by a motor (not shown), such as the motor driving feed roller 20B. Frictional resistance between cleaner roller driver 124 and cleaner roller 46B allows cleaner roller driver 124 to drive the rollers of card cleaner 18 with sufficient force to drive a card 22 therethrough. The cleaner roller driver 124 could be positioned elsewhere to drive, for example, first cleaner roller 46A, first tape roller 48A, or second tape roller 48B. Furthermore, other means could be provided to drive the cleaning rollers in accordance with known methods.

In accordance with one embodiment, cleaner roller driver 124 includes a one-way clutch that allows feed roller 20B to pull card 22 being fed therethrough in the direction of arrow 26 without obstruction by cleaner roller driver 124. Thus, if feed roller 20B is pulling card 22 at a higher speed than that at which cleaner roller driver 124 is driving the card 22 through card cleaner 18, feed roller 20B will be able to pull the card forward along the print path unhindered. A sensor 126 can be provided to sense a card 22 being fed by feed roller 20B, such that cleaner roller driver 124 can be disengaged. Additionally, when sensor 126 senses a card 22, the motor driving feed roller 20A can be shut off to prevent multiple card feeds.

Another advantage to driving the cleaner rollers 46A and 46B is that the debris collected on them can be better removed by driving the rollers of card cleaner 18 when a card 22 is not present such that cleaner rollers 46A and 46B are in direct contact with each other. This allows debris from cleaner roller 46A to transfer to cleaner roller 46B and then on to tape loop 50. In accordance with one embodiment, cleaner roller driver 124 is driven by the motor driving feed roller 20A. Once a card 22 is sensed by sensor 126, the motor driving feed roller 20A and cleaner roller driver 124 is turned off and the card 22 continues to be pulled through card cleaner 18 by feed roller 20B. A gap is formed between successively fed cards by delaying the driving of feed roller 20A and cleaner roller driver 124. The gap between successively fed cards 22 allows cleaner rollers 46A and 46B to be driven while in contact with each other to transfer debris collected on them to the tape loop 50. Also, the rollers of card cleaner 18 can be cleaned following the transport of the last card 22 of a print job by driving them for a short period of time.

Once a card 22 is completely fed through card cleaner 18, the transport mechanism 14 delivers the card 22 to printhead 16 for printing, or to other processing devices such as a magnetic stripe encoder, a card flipper, or a laminator.

Although the present invention has been described with reference to preferred embodiments, workers skilled in the art will recognize that changes may be made in form and detail without departing from the spirit and scope of the invention. For example, the cleaner rollers could be positioned differently relative to the tape rollers while still providing the desired function described herein.

What is claimed is:

1. A card cleaner assembly for use in an identification card printer comprising:
   first and second cleaner pinch rollers adapted to receive a transported card therebetween;
   first and second tape rollers supporting a cleaning tape loop, the cleaning tape loop sandwiched between the second cleaner pinch roller and the first tape roller and including debris-collecting exterior surface that engages the second cleaner pinch roller;
   a first bracket for supporting the first and second cleaner pinch rollers and the first tape roller;
   a second bracket supporting the second tape roller, wherein the first and second brackets are configured in sliding arrangement having a roller release position in which at least one of the first and second cleaner pinch rollers or the first tape roller is removable, and an operating position in which the first and second cleaner pinch rollers are set to clean a transported card; and
   a biasing mechanism configured to bias the first and second brackets in the operating position.

2. The card cleaner roller assembly of claim 1, wherein the cleaner pinch rollers are coated with a debris-collecting material.

3. The card cleaner roller assembly of claim 1, wherein the biasing mechanism includes a spring coupled to both the first and second brackets.

4. The card cleaner roller assembly of claim 1, wherein either the first or second bracket includes a channel in which a portion of the other bracket can slide.

5. An identification card printer comprising:
   a card supply containing a stack of cards;
   a transport mechanism adapted to receive a card from the card supply and transport the card along a print path;
   a card cleaner roller assembly including:
      first and second cleaner pinch rollers adapted to receive a transported card therebetween;

first and second tape rollers supporting a cleaning tape loop, the cleaning tape look sandwiched between the second cleaner pinch roller and the first tape roller;

a first bracket for supporting the first and second cleaner pinch rollers and the first tape roller;

a second bracket supporting the second tape roller, wherein the first and second brackets are configured in sliding arrangement having a roller release position in which at least one of the first and second cleaner pinch rollers or the first tape roller is removable, and an operating position in which the first and second cleaner pinch rollers are set to clean a transported card; and a biasing mechanism configured to bias the first and second brackets in the operating position; and a printhead positioned along the print path and adapted to deposit print material on a surface of the card.

6. The printer of claim 5, wherein the transport mechanism includes a cleaner roller driver adapted to drive at least one of the first and second cleaner pinch rollers or tape rollers to assist in the transport of the cards through the cleaner roller assembly.

7. The printer of claim 6, wherein the cleaner roller drive has a one-way clutch allowing the card to be pulled through the card cleaner roller assembly unhindered.

8. The printer of claim 5, wherein the transport mechanism includes a card feed roller adapted to receive a card passing through the cleaner pinch rollers of the card cleaner roller assembly.

9. The printer of claim 5, wherein the cleaner pinch rollers are coated with a debris-collecting material.

10. The printer of claim 5, wherein the biasing mechanism includes a spring coupled to both the first and second brackets.

11. The printer of claim 5, wherein either the first or second bracket includes a channel in which a portion of the other bracket can slide.

* * * * *

UNITED STATES PATENT AND TRADEMARK OFFICE
CERTIFICATE OF CORRECTION

PATENT NO. : 6,985,167 B2 Page 1 of 1
APPLICATION NO. : 10/372071
DATED : January 10, 2006
INVENTOR(S) : Brent D. Lien It is certified that error appears in the above-identified patent and that said Letters Patent is hereby corrected as shown below:

Claim 5, column 7, line 2 cancel "look" an insert --loop--

Signed and Sealed this

Twenty-second Day of August, 2006

JON W. DUDAS
*Director of the United States Patent and Trademark Office*